(12) United States Patent
Forster

(10) Patent No.: US 8,115,636 B2
(45) Date of Patent: Feb. 14, 2012

(54) RFID TAG WITH A REDUCED READ RANGE

(75) Inventor: Ian James Forster, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 109 days.

(21) Appl. No.: 12/017,778

(22) Filed: Jan. 22, 2008

(65) Prior Publication Data

US 2009/0184824 A1    Jul. 23, 2009

(51) Int. Cl.
*G08B 13/14* (2006.01)

(52) U.S. Cl. ............... 340/572.3; 340/572.1; 340/572.4; 340/572.5

(58) Field of Classification Search ............ 340/500, 340/540, 568.1, 572.1, 539.26, 539.27, 539.22, 340/572.3, 572.4, 572.7, 572.8, 572.5, 539.1; 361/800, 816, 818; 307/117; 343/787, 895
See application file for complete search history.

(56) References Cited

U.S. PATENT DOCUMENTS

| | | | |
|---|---|---|---|
| 4,673,923 A | 6/1987 | Boscoe et al. | |
| 4,863,772 A | 9/1989 | Cross | |
| 5,647,107 A | 7/1997 | Brewster | |
| 6,019,865 A | 2/2000 | Palmer et al. | |
| 6,451,154 B1 | 9/2002 | Grabau et al. | |
| 6,787,208 B2 | 9/2004 | Galovic | |
| 6,927,738 B2 | 8/2005 | Senba et al. | |
| 6,940,408 B2 | 9/2005 | Ferguson et al. | |
| 6,951,596 B2 | 10/2005 | Green et al. | |
| 7,170,415 B2 * | 1/2007 | Forster | 340/572.4 |
| 7,253,734 B2 * | 8/2007 | Moskowitz | 340/572.3 |
| 7,361,251 B2 | 4/2008 | Green et al. | |
| 7,368,032 B2 | 5/2008 | Green et al. | |
| 7,633,394 B2 * | 12/2009 | Forster | 340/572.4 |
| 7,884,724 B2 * | 2/2011 | Tuttle et al. | 340/572.7 |
| 2003/0075608 A1 | 4/2003 | Atherton | |
| 2003/0080917 A1 | 5/2003 | Adams et al. | |
| 2003/0116634 A1 | 6/2003 | Tanaka | |
| 2003/0136503 A1 | 7/2003 | Green et al. | |
| 2003/0156032 A1 | 8/2003 | Adams et al. | |
| 2003/0169153 A1 * | 9/2003 | Muller | 340/10.51 |
| 2004/0119593 A1 | 6/2004 | Kuhns | |
| 2005/0012616 A1 * | 1/2005 | Forster et al. | 340/572.7 |
| 2006/0012481 A1 | 1/2006 | Rajapakse | |
| 2006/0125641 A1 | 6/2006 | Forster | |
| 2006/0145841 A1 | 7/2006 | Daurensan et al. | |
| 2007/0171081 A1 * | 7/2007 | Dixon et al. | 340/572.8 |

(Continued)

FOREIGN PATENT DOCUMENTS

EP    1 262 932    12/2002

(Continued)

OTHER PUBLICATIONS

International Search Report and Written Opinion issued in corresponding PCT/US2005/042955 dated Apr. 19, 2006.

(Continued)

*Primary Examiner* — Brian Zimmerman
*Assistant Examiner* — An Nguyen

(57) ABSTRACT

A radio-frequency identification (RFID) tag is provided that comprises an RFID inlay having a read range. The RFID tag also comprises a facestock or substrate affixed to the RFID inlay. The RFID tag further comprises a radio frequency (RF) altering material affixed to the facestock or substrate that is configured to permanently reduce the read range of the RFID inlay.

25 Claims, 6 Drawing Sheets

U.S. PATENT DOCUMENTS

| | | | |
|---|---|---|---|
| 2008/0297355 A1* | 12/2008 | Matsumoto et al. | ....... 340/572.7 |
| 2009/0108993 A1 | 4/2009 | Forster | |
| 2009/0184824 A1 | 7/2009 | Forster | |
| 2009/0206995 A1 | 8/2009 | Forster | |

FOREIGN PATENT DOCUMENTS

| | | |
|---|---|---|
| EP | 1 132 859 | 1/2006 |
| FR | 2 784 083 | 4/2000 |
| WO | 00/21026 | 4/2000 |
| WO | 01/73685 | 10/2001 |
| WO | 2006/055653 | 5/2006 |
| WO | 2006/060324 | 6/2006 |
| WO | 2009/094283 | 7/2009 |
| WO | 2009/105370 | 8/2009 |

OTHER PUBLICATIONS

Office Action issued in corresponding European Patent Application No. 05 825 721 dated Oct. 29, 2008.

Patent Abstracts of Japan, vol. 1999, No. 05, May 31, 1999 & JP 11-053656, Feb. 26, 1999, abstract.

International Search Report and Written Opinion issued in corresponding PCT/US2009/033756 dated May 8, 2009.

International Preliminary Report on Patentability issued in corresponding PCT/US2005/042955 dated Apr. 18, 2008.

Office Action issued in corresponding EP 05 825 721 dated Feb. 12, 2010.

International Preliminary Report on Patentability issued in corresponding IA No. PCT/US2009/31051 dated Apr. 16, 2010.

International Search Report and Written Opinion issued in corresponding IA No. PCT/US2009/31051 dated Apr. 17, 2009.

International preliminary report on patentability issued in corresponding International application PCT/US2009/033756 dated May 20, 2010.

Reply to International search report and written opinion issued in corresponding International application PCT/US2009/033756 on Jul. 7, 2009.

Reply to International search report and written opinion issued in corresponding International application PCT/US2009/031051 on Aug. 21, 2009.

Office action issued in related U.S. Appl. No. 12/033,428 dated Dec. 13, 2010.

Office action issued in related U.S. Appl. No. 12/033,428 dated Mar. 25, 2010.

Office action issued in related U.S. Appl. No. 12/033,428 dated Aug. 19, 2010.

* cited by examiner

US 8,115,636 B2

RFID TAG WITH A REDUCED READ RANGE

TECHNICAL FIELD

The present invention relates to radio-frequency identification (RFID) tags, and in particular to an RFID tag with a reduced read range.

BACKGROUND OF THE INVENTION

Automatic identification is the broad term applied to a host of technologies that are used to help machines identify objects. Automatic identification is often coupled with automatic data capture. Therefore, companies wanting to identify items are able to capture information about the items, to store information in a computer, and to selectively retrieve the information from the computer for a variety of useful purposes, all with minimal human labor.

One type of automatic identification technology is radio-frequency identification (RFID). RFID is a term used for technologies that use radio waves in the automatic identification of objects. There are several conventional methods of identifying objects using RFID, the most common of which is to store a serial number (and other information, if desired) that identifies a product on a microchip that is attached to an antenna. The chip and the antenna together along with the supporting substrate on which they are provided define an RFID inlay. The antenna enables a remote reader (e.g., an RFID reader) that has a transceiver to communicate with the chip, and enables the chip to transmit identification information back to the reader when actuated to do so (e.g., interrogated) by the reader. The RFID reader converts the radio waves returned from the RFID tag into a form that can then be utilized by a computer.

BRIEF SUMMARY OF THE INVENTION

One aspect of the invention is related to a radio-frequency identification (RFID) tag comprising an RFID inlay having a read range. The RFID tag also comprises a substrate affixed to the RFID inlay. The RFID tag further comprises a radio frequency (RF) altering material affixed to the substrate that is configured to permanently reduce the read range of the RFID inlay.

Another aspect of the invention is related to an RFID tag comprising an RFID inlay having a read range. The RFID tag also comprises an RF altering material applied to the RFID inlay that is configured to permanently reduce the read range of the RFID inlay.

Still another aspect of the invention is related to an RFID tag comprising an RFID inlay having a read range. The RFID tag also comprises a facestock affixed to the RFID inlay; wherein the facestock includes an RF altering material that is configured to reduce the predetermined read range of the RFID inlay. The RFID tag further comprises a liner removeably attached to the RFID inlay.

Yet another aspect of the invention is related to a method for forming an RFID tag comprising providing a facestock. The method also comprises affixing an RF altering material to the facestock, the RF altering material being configured to permanently alter a read range of an RFID inlay. The method further comprises affixing the RFID inlay with the read range onto the facestock.

DETAILED DESCRIPTION OF THE INVENTION

Radio Frequency Identification (RFID) tags are used in a wide range of application environments. A typical RFID tag can include an RFID inlay having a circuit device, (hereinafter, "RFID inlay") that is mounted on a substrate or carrier, to which can be applied a facestock. Adding certain materials to the facestock can alter a read range associated with the RFID tag. Alteration of the RFID tag read range can allow the same (or similar) RFID inlay to be employed in a wide range of application environments.

Figure 1:
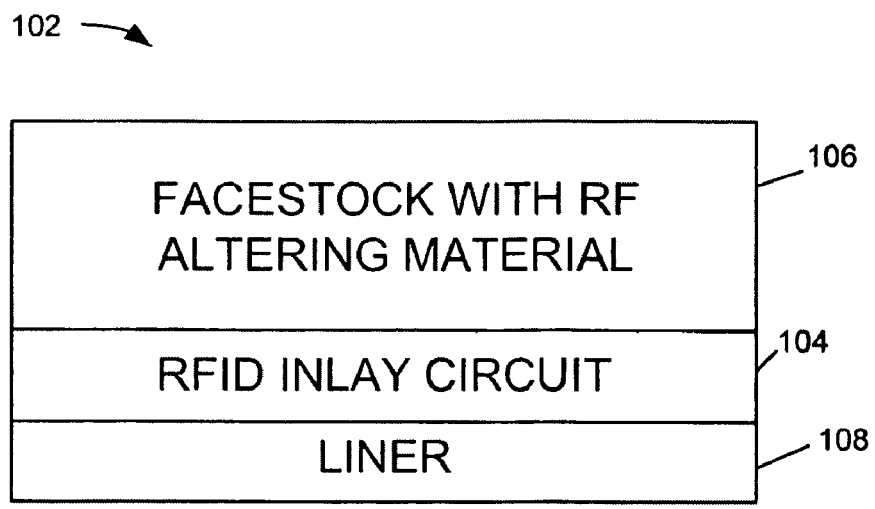
FIG. 1 illustrates a block diagram of an RFID tag according to an aspect of the invention.

FIG. 1 illustrates a block diagram of an RFID tag 102 in accordance with an aspect of the invention. As used herein, the terms "tag" and "RFID tag" refer to an information medium that includes identifying and/or other information in an RFID device. The RFID tag 102 includes an RFID inlay 104 (e.g., a circuit) that can transmit and receive a radio frequency (RF) signal. The transmitted RF signal can be sent in response to an interrogation signal sent by an RFID reader. The transmitted RF signal can provide, for example, identification information (e.g., a serial number or identification number) to the RFID reader. As an example, the RFID inlay 104 can be designed to transmit and receive RF signals at a frequency of about 865 MHz to about 868 MHz or about 902 MHz to about 928 MHz; although one skilled in the art will appreciate that other frequencies could be employed.

The RFID inlay 104 includes an antenna to receive and transmit the RF signal, wherein the antenna can be electrically coupled to an integrated circuit (IC) chip. The IC chip can supply the RF signal, for example, in response to receiving (via the antenna), an incoming interrogation signal (e.g., an actuation signal) transmitted by an external system, such as the RFID reader discussed above. The RFID tag 102 can typically have a maximum read range of about, for example, 8 meters. It is to be understood that the term "read range" refers to both the range at which the RFID tag 102 can coherently receive interrogation signals transmitted from an external source (e.g., an RFID reader), as well as the range at which the external system can coherently receive a returned signal propagated from the RFID tag 102. One skilled in the art will appreciate that for certain application environments, a longer read range than wanted can cause problems. For example in retail applications, if a reader system (that includes an RFID reader) is required to inventory all items in a location, RFID tags with an unnecessarily long read range may be detected when they are outside the desired area, making the inventory inaccurate or confusing. As another example, in a warehouse or manufacturing environment with docking doors, shipments of items are often either sent out or received. In such a situation, items with RFID tags can be loaded on a pallet, and each dock door can have its own reader system or antennas. If items moving through a first dock door are read by the reader system on the second dock door, due to unnecessarily high read ranges, inventory systems can become confused, since the inventory systems are expecting materials to move in a defined way. Such confusion can require expensive manual checking. Additionally, a long read range can interfere with the fast reading of other nearby RFID tags, as the long read range will increase the number of tags responding to a reader system, slowing down a reading protocol to accommodate these additional unwanted tag responses.

The RFID inlay 104 can be adhered to a substrate or facestock 106. The facestock or substrate 106 can be formed, for example, with paper or plastic. The facestock 106 can be affixed to the RFID inlay 104, for example, by an adhesive, such as a pressure-sensitive adhesive material. The facestock 106 can include a material for interfering with RF signals transmitted by the RFID inlay 104 or interrogation signals coming from an external source (e.g., an RFID reader), which can be referred to as RF altering material. Such an interference with RF signals can alter the read range of the RFID inlay 104. For instance, the RF altering material may interact with the near magnetic field around the RFID inlay antenna, the near electric field or both. This interaction can alter the read range of the RFID inlay 104 in a number of ways. For example, such interaction can alter the frequency at which a maximum read range from the RFID inlay 104 is achieved (e.g., the intended reading frequency). Additionally, the interaction can absorb energy and thereby reduce the energy available to operate the RFID inlay 104 and hence requiring the RFID tag 102 to be closer to an RFID reader to operate. Further still, the interaction can alter the impedance of the antenna of the RFID inlay 104. Such altering of the impedance can effect the ability of the RFID tag 102 to receive power, thereby limiting (or even eliminating) the read range. Additionally or alternatively, altering the impedance can alter the level of modulated backscattered signal re-radiated to a reading system, which, if the RFID reader has a limited receive sensitivity, or is set to only detect signals above a certain threshold, can functionally restrict (or eliminate) the read range.

As an example, the read range of the RFID tag 102 can be altered by altering the sensitivity of the RFID inlay 104 to a specific frequency or a range of frequencies. For instance, reduction of the sensitivity of the RFID tag 102 can prevent the RFID inlay 104 from responding to interrogation signals at a specific frequency. Alternatively, certain configurations of the RF altering material could be employed to increase sensitivity of the RFID tag 102 such that the RFID tag 102 is more responsive to interrogation signals at a specific frequency or range of frequencies. In other implementations, alteration of the sensitivity of the RFID inlay 104 can alter a radiation pattern of RF signals transmitted to and from the RFID inlay 104, thereby altering the effective direction of transmission for the RF signals.

As another example, the read range of the RF altering material of the RFID tag 102 could be employed to reduce backscattering (e.g., wave reflections) of an RF signal at a specific frequency or range of frequencies. Reduction in the backscattering could be used, for example to alter the direction of RF signals propagated by the RFID inlay 104. Alternatively, in other configurations, the RF altering material could be employed to increase backscattering of an RF signal at a specific frequency or range of frequencies.

The RF altering material and the configuration of the RF altering material can be selected, for example, to meet the needs of a particular application environment. As is known, RFID tags can be employed in a very broad range of environments, including but not limited to: material handling, retail facilities and other identification systems. Such an extensive array of application environments requires a broad spectrum of read ranges. In the present invention, the RFID tag 102, the same (or similar) RFID inlay 104 can be employed in nearly all application environments by selecting a configuration and type of RF altering material for the facestock 106.

As one example, the facestock 106 can include a layer of RF altering material. For instance, particles of the RF altering material could be dispersed throughout the adhesive material of an adhesive layer. In such a situation (particles of RF altering material dispersed throughout the adhesive material), adjusting the density of the RF altering material particles in the adhesive material can adjust the read range of the RFID tag 102. The adjustment to the read range can occur, for instance, by the RF altering material absorbing RF energy emitted or received at the RFID inlay 104, thereby interfering with (e.g., altering) RF signals propagated to and from the RFID inlay 104. Additionally or alternatively, the RF altering material can alter the frequency at which maximum RF signals are emitted or received by the RFID inlay 104, thereby affecting the read range of the RFID tag 102. As an alternative, the adhesive material (e.g., a conductive adhesive) itself can include RF interfering properties, such that the adhesive material can interact (e.g., interfere) with RF signals propagated to and from the RFID inlay 104, thereby reducing the read range of the RFID tag 102. In another example, the RF altering material can be implemented as a separate layer of material. The RFID tag 102 can be configured such that the RFID inlay 104 is in relatively close proximity to the RF altering material.

In yet another example, particles of the RF altering material could be dispersed throughout the facestock 106. The RF altering material could be applied to the facestock 106, for example, by a thermal printer that can adjust the exposure time and/or the heat intensity (e.g., the temperature) of the thermal printer when the facestock 106 is printed. In certain implementations, the adjustment of the exposure time and/or heat intensity of the thermal printer can alter RF interference properties of the particular RF altering material. Similarly, in some implementations, the interference properties of the RF altering material can be adjusted by altering the amount and/or duration of pressure applied to the facestock 106. Alternatively, the RF altering material could be applied to the facestock 106 by a printer with a ribbon that contains the RF altering material, such as carbon suspended in a thermally applied material such as a wax. Additionally, a liner 108 can be attached to the RFID tag 102. The liner 108 can be formed from similar material as the facestock 106 (e.g., paper, plastic, etc.). The liner 108 can be removeably attached to the RFID tag 102, such as by a non-curing, pressure-sensitive adhesive material (e.g., silicone). Alternatively, the liner 102 can be permanently affixed to the RFID tag 102 by a pressure sensitive adhesive material. The liner 108, can be attached, for example, to one side of the RFID tag 102 (e.g., a back or bottom of the RFID inlay 104).

In certain environments of application, such as in a retail store, it may be desirable to manually apply the RF altering material. The RF altering material could be applied to the facestock 106, for example by an end user (e.g., a retail store cashier) to substantially reduce or even eliminate the read range of the RFID tag 102. Reduction or elimination of the read range of the RFID tag 102 could be desirable, for example, when an item that contains the RFID tag 102 is purchased. The RF altering material could be dispensed, for example, with a marker (e.g., a pen) containing the RF altering material (e.g., conductive ink). Alternatively, the RF altering material could be suspending in a stick of wax (e.g., a crayon) and applied to the RFID tag 102 by wiping the stick of wax over the RFID tag 102. As another alternative, the RF altering material could be manually applied with a sprayer (e.g., a paint sprayer) that contains the RF altering material. In such an application environment, outlines for specific configurations for the RF altering material could be printed on an outside face of the facestock 106 (e.g., the top of the facestock 106) to direct the end user as to the area or areas to apply the RF altering material to achieve a specific read range. The RF altering material could also be applied by placing an RF altering material containing label or cover sheet over the RFID tag 102.

The RF altering material can include, for example, a dielectric, such as plastics, for example polyethylene, polypropylene, polyethylene terephthalate (PET), a ceramic, such as barium tetratitanate or titanium dioxide, paper or other primarily organic materials, a material with polar molecules, such as liquid crystals or composites of such materials designed to give the desired characteristics. The formation of composites can be achieved by suspending particles of a material in a second material, for example ceramic particles suspended in a plastic, or applying layers of different materials by methods such as printing, coating or vapor phase deposition in a patterned or unpatterned stack. A dielectric material that is exposed to a high frequency RF signal is commonly characterized by two values; the relative dielectric constant and a loss factor, which correspond to the ratio of the complex and real part of the dielectric material permittivity. An example of material with a relatively low dielectric constant and low loss would be polytetrafluoroethylene (PTFE); the dielectric constant, commonly denoted as $\epsilon_r$, is in the range 2.0-2.1 and the associated loss factor is about 0.00028 @ about 3 GHz. An example of a material with a higher relative dielectric constant and higher loss would be ethyl alcohol, $\epsilon_r$=about 6.5 and loss factor of about 0.25 @ about 3 GHz.

A specific read range of the RFID tag 102 can be realized by adjusting the amount of dielectric material in the facestock 106. Additionally or alternatively, the physical relationship between the location of a layer of dielectric material and the RFID inlay 104 antenna can be adjusted. For example, the closer in proximity the dielectric material layer is to the antenna of the RFID inlay 104, the larger the percentage of electric fields propagated to and from the antenna of the RFID inlay 104 will be altered by the dielectric material layer. Conversely, the further in proximity the dielectric material layer is to the antenna of the RFID inlay 104, the smaller the percentage of electric fields propagated to and from the antenna of the RFID inlay 104 will be altered by the dielectric material layer. As described above, particular dielectric materials have a specific dielectric constant and loss factor. The interaction of these factors with an RFID inlay 104 placed in proximity is dependent on the design and construction of the RFID tag 102; however, in general, for a simple antenna such as a half wave dipole, proximity with a material with a relatively high dielectric constant will reduce the operating frequency, and proximity to a material with a high loss factor will reduce the read range by adsorbing some of the RF energy. Accordingly, selection of particular dielectric materials for the facestock 106 can provide further adjustment to the read range of the RFID tag 102. Such adjustments of the amount of dielectric material, the physical configuration of the dielectric material layer relative to the RFID inlay 104 and/or the type of dielectric material employed can provide for a large variance in the read range of the RFID tag 102 while employing the same (or similar) RFID inlay 104.

As another example, the RF altering material could be formed with conductive material, such as silver, copper, gold or aluminum. In other implementations, a conductive ink (e.g., ink containing silver and/or carbon) could be implemented as the RF altering material. In yet other implementations, the adhesive material can have conductive properties, such that the adhesive material itself can provide the conductive material. The conductive material could be applied to the facestock 106, for example, as a thin layer of vapor deposited metal, by employing a vapor deposition process, such as evaporative deposition, electron beam physical vapor deposition, pulsed laser deposition, etc. Moreover, when employing conductive ink, a printer (e.g., a ribbon printer) that is printing the facestock 106 could adjust the quantities of conductive ink applied to the facestock 106 to provide for fine tuning of the conductivity of the layer of conductive material. As another alternative, some organic compounds, such as poly(3-hexylthiophene), poly(p-phenylene vinylene), increase in conductivity when exposed to ultraviolet (UV) radiation. Accordingly, increasing the time and/or intensity (e.g., the temperature) of UV radiation to the organic compounds can allow for precise tuning of the conductivity of the organic compounds. Thus, when employing organic compounds as the RF altering material, a thermal printer that prints the facestock 106 can adjust the conductivity of the RF altering material by adjusting the thermal exposure and/or thermal intensity of the thermal printer when printing the facestock 106.

The interaction of the conductive material with an RFID inlay 104 placed in proximity is dependent on the design and construction of the RFID tag 102; however, in general, for a simple antenna such as a half wave dipole, and for layers of a relatively low conductivity, the material adsorbs RF energy, reducing the effective sensitivity of the RFID inlay 104. At increased conductivity, the material both absorbs RF energy and modifies the impedance of the antenna and hence alters the matching between the antenna and RFID device. A material with a high conductivity, such as a copper or aluminum foil with a thickness greater than 9 micrometers, for frequencies in the range of about 800 MHz to about 1000 MHz, the material will primarily reflect RF energy and alter the impedance of the antenna relative to the RFID device. As described above, the effect can depend, for example, on the amount of conductive material. Additionally or alternatively, the physical relationship between the location of a layer of conductive material and the RFID inlay 104 antenna can be adjusted. For example, the closer in proximity the conductive material layer is to the antenna of the RFID inlay 104, the larger the effect. Conversely, the further in proximity the conductive material layer is to the antenna of the RFID inlay 104, the smaller the effect. Such adjustments of the amount of conductive material and/or the physical configuration of the conductive material layer relative to the RFID inlay 104 antenna can provide for a large variance in the read range of the RFID tag 102 while employing the same (or similar) RFID inlay 104. Moreover, precise control of the conductivity of the RF altering layer (e.g., by a ribbon or thermal printer) can allow for fine adjustments (e.g., tuning) in the read range of the RFID tag 102.

The RF altering material can also include, for example, a magnetic material, such as some metals, (e.g., iron and nickel), or ferrites, which can be manufactured with a number of different compositions to get the desired characteristics, but are commonly an oxide containing iron and other metals such as nickel, zinc or manganese. These magnetic materials can be mixed with other materials, such as dielectrics, to form composites, by suspending particles of a magnetic material in a second material. For example, ferrite particles can be suspended in a plastic to create a composite material. Alternatively, the composite material could be formed by employing layers of different materials by methods such as printing, coating or vapour phase deposition in a patterned or unpatterned stack.

A magnetic material exposed to a high frequency RF signal is commonly characterized by two values; the relative permeability and a loss factor. A specific read range of the RFID tag 102 can be realized by adjusting the amount of magnetic material in the facestock 106. Additionally or alternatively, the physical relationship between the location of a layer of magnetic material and the RFID inlay 104 antenna can be adjusted. For example, the closer in proximity the magnetic material layer is to the antenna of the RFID inlay 104, the larger the percentage of magnetic fields propagated to and from the antenna of the RFID inlay 104 will be altered by the magnetic material layer. Conversely, the further in proximity the magnetic material layer is to the antenna of the RFID inlay 104, the smaller the percentage of magnetic fields propagated to and from the antenna of the RFID inlay 104 will be altered by the magnetic material layer. As described above, particular magnetic materials have a specific relative permeability and loss factor. The interaction of these factors with the RFID inlay 104 placed in proximity is dependent on the design and construction; however, in general, for a simple antenna such as a half wave dipole, proximity with a material relatively high permeability constant will reduce the operating frequency, and proximity to a material with a relatively high loss factor will reduce the read range by adsorbing some of the RF energy. Accordingly, selection of particular magnetic materials for the facestock 106 can provide further adjustment to the read range of the RFID tag 102. Such adjustments of the amount of magnetic material, the physical configuration of the magnetic material layer relative to the RFID inlay 104 and/or the type of magnetic material employed can provide for a large variance in the read range of the RFID tag 102 while employing the same (or similar) RFID inlay 104.

It is also considered that the facestock 106 could be implemented with a combination of a dielectric, a conductive material and a highly magnetically permeable material. Such a combination would allow for a very precise adjustment of the read range for the RFID tag 102.

Figure 2:
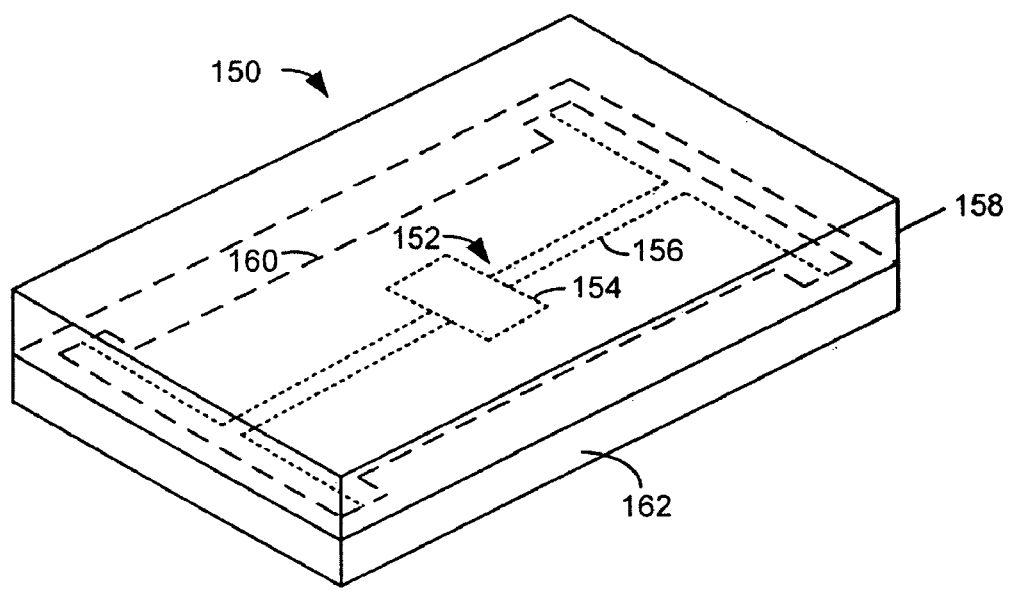
FIG. 2 illustrates a perspective view of an RFID tag in accordance with an aspect of the invention.

FIG. 2 illustrates a perspective view of an RFID tag 150 in accordance with an aspect of the invention, such as the RFID tag 102 illustrated in FIG. 1. In FIG. 2, different line patterns are employed to indicate different planes. As an example, the RFID tag 150 can have a substantially rectangular shape. The RFID tag 150 can include an RFID inlay 152 that includes an IC chip 154 for providing identification information to an associated antenna 156. The antenna 156 can transmit an RF signal that provides the identification information to an external system, such as an RFID reader in response to receiving an interrogation signal from the RFID reader.

The RFID tag 150 can include a facestock 158 that is affixed to the RFID inlay 152. The RFID inlay 152 can be attached to the facestock 158 with an adhesive material (not shown). The facestock 158 can include a layer of RF altering material 160 which is in relatively close proximity to the RFID inlay 152. The RF altering material 160 can reduce a read range of an RF signal propagated to and from the antenna 156 of the RFID inlay 152. The amount of alteration (e.g., attenuation) can depend, for example, on the particular material chosen for the RF altering material 160, as well as the physical configuration of the RF altering material 160 relative to the RFID inlay 152. As discussed above with respect to FIG. 1, the type of RF altering material 160, the physical configuration of the RF altering material 160 and/or the physical relationship between the RF altering material 160 and the RFID inlay 152 can be chosen to fit the needs of the particular environment of application for which the RFID tag 150 is to be employed. A liner 162 can also be attached to one side of the RFID inlay 152. The liner 162 can, for example, be removeably attached to the RFID inlay 152 with a non-curing adhesive material or release material (e.g. silicone).

Figure 3:
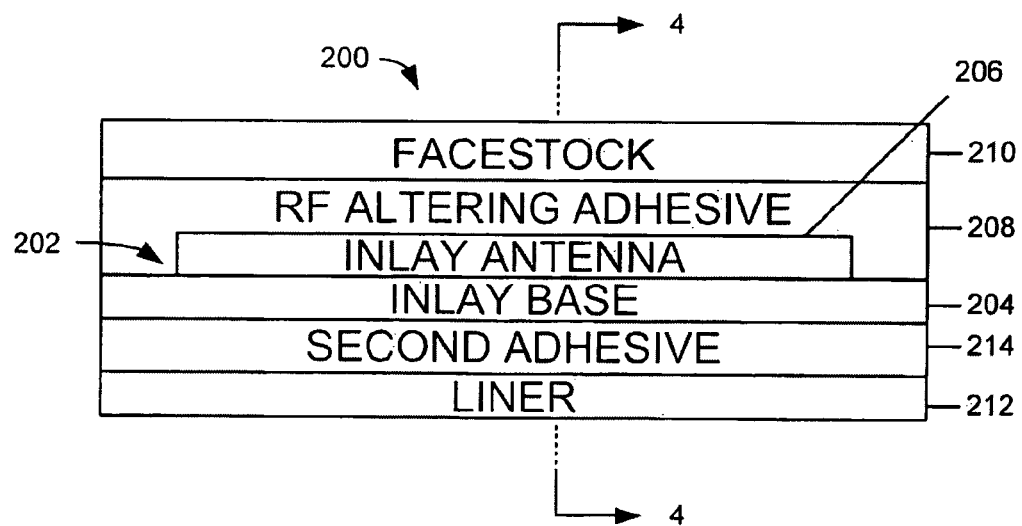
FIG. 3 illustrates another block diagram of an RFID tag according to an aspect of the invention.
Figure 4:
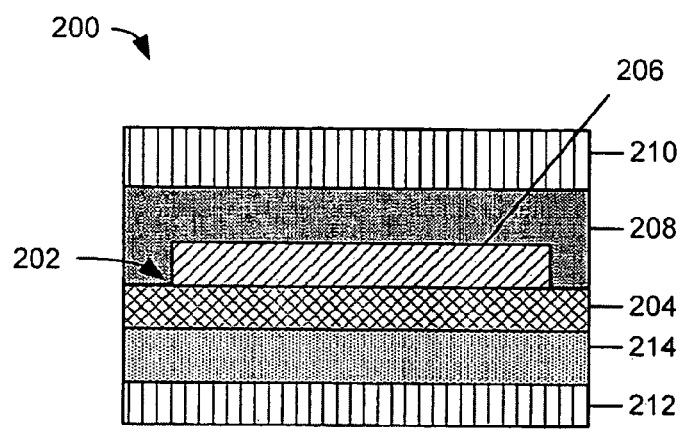
FIG. 4 illustrates a cross section of the RFID tag of FIG. 3 taken along line 4-4 thereof.

FIG. 3 illustrates another example of an RFID tag 200 in accordance with an aspect of the invention. FIG. 4 illustrates a cross-sectional view of the RFID tag 200 illustrated in FIG. 3 taken along line 4-4 thereof. For purposes of simplification of explanation, the same reference numbers have been used in both FIGS. 3 and 4. The RFID tag 200 includes an RFID inlay 202 that includes an inlay base 204. The inlay base 204 could be formed, for example with PET or paper and can include an IC chip. The RFID inlay 202 can also include an antenna 206 coupled to the inlay base 204 that can transmit and receive RF signals transmitted to and from the inlay base 204. The RFID inlay 202 is attached to a facestock 210 with an RF altering adhesive material 208. The RF altering adhesive material 208 can be implemented, for example, as a pressure sensitive adhesive with RF altering material particles dispersed throughout the adhesive material 208. The RF altering material could be implemented, for example, as a dielectric material, a conductive material, a highly magnetically permeable material or a combination thereof. Alternatively, adhesive material 208 itself can have RF altering properties (e.g., a conductive adhesive). The facestock 210 could be formed, for example with paper or plastic, and can be printed or laminated onto the adhesive material 208. Additionally, the RFID tag 200 can include a liner 212, which can be formed with the same or similar material as the facestock 210. The liner 212 can, for example, be removeably or permanently attached to the RFID tag 200 (and in particular to the inlay base 204) via a second adhesive 214. The second adhesive 214 could be implemented, for example, as a pressure sensitive adhesive.

As previously discussed, the amount of RF altering material dispersed in the adhesive material 208, or the type of adhesive material 208 chosen can attain a specific read range for the RFID tag 200. Such an adjustment allows for the same (or similar) RFID inlay 202 to be employed in a large variety of application environments, since the read range of the RFID tag 200 can be adjusted by a wide variance.

Figure 5:
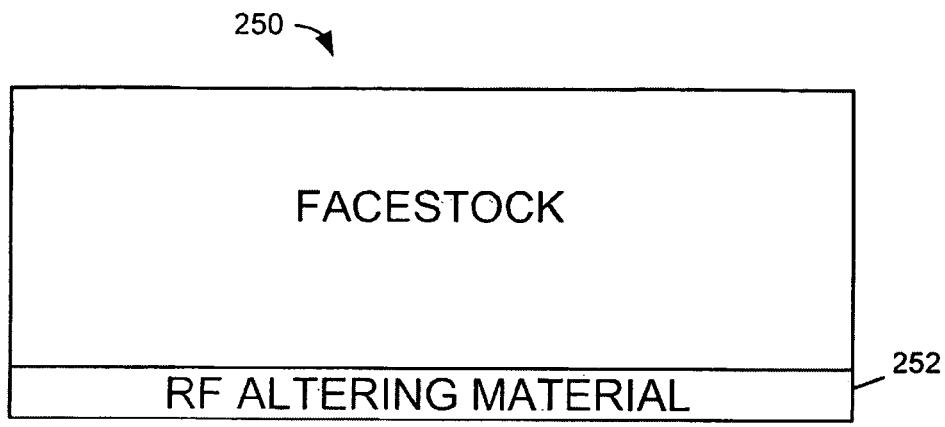
FIG. 5 illustrates another block diagram of an RFID tag according to an aspect of the invention.

FIG. 5 illustrates a cross sectional view of a facestock 250 in accordance with an aspect of the invention. The facestock 250 includes a layer of RF altering material 252. The RF altering material 252 could be implemented, for example, as a dielectric material, a conductive material, a highly magnetically permeable material or a combination thereof. The rest of the facestock 250 could be formed, for example, with paper or plastic. The layer of RF altering material 252 could be used in an RFID tag to reduce the read range of the RFID tag.

Figure 6:
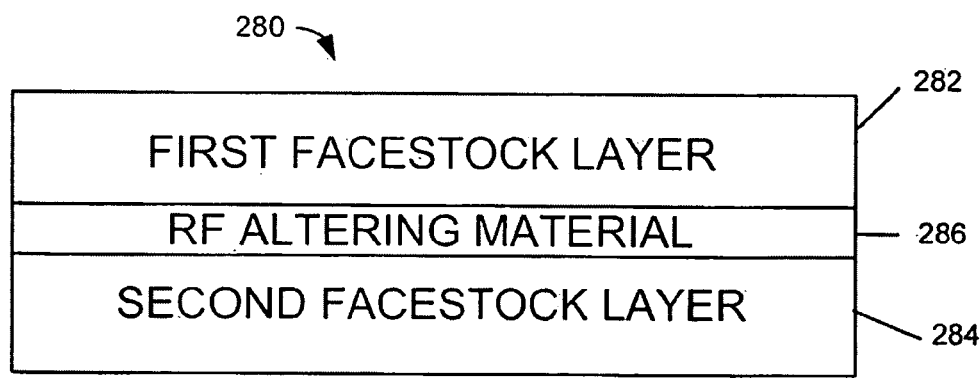
FIG. 6 illustrates yet another block diagram of an RFID tag according to an aspect of the invention.

FIG. 6 illustrates another cross sectional view a facestock 280 in accordance with an aspect of the invention. In the exemplary facestock 280 illustrated, the facestock 280 includes two facestock layers, namely a first facestock layer 282 and a second facestock layer 284. The first and second facestock layers 282 and 284 could be formed, for example, with similar (or the same materials), such as paper or plastic. A middle layer of RF altering material 286 can be disposed between the first and second layers 282 and 284 of the facestock 280, thereby forming a sandwich structure. The RF altering material 286 could be implemented, for example, as a dielectric material, a conductive material, a highly magnetically permeable material or a combination thereof. The layer of RF altering material 286 could be used in an RFID tag to reduce the read range of the RFID tag.

Figure 7:
FIG. 7 illustrates a top view of a facestock in accordance with an aspect of the invention.
Figure 8:
FIG. 8 illustrates a top view of another facestock in accordance with an aspect of the invention.

FIGS. 7 and 8 illustrate a top view of a facestock 300 in accordance with an aspect of the invention. For purposes of simplification of explanation, the same reference numbers will be used in FIGS. 7 and 8 to indicate the same structure. The facestock 300 could be formed, for example with paper or plastic. Additionally, each facestock 300 could include a section of RF altering material 302 and 304. The sections of RF altering material 302 and 304 could each be disposed on one side of the facestock 300 (e.g., a front or back of the facestock 300). The RF altering material 302 and 304 could be applied, for example, by a thermal printer or a printer with a ribbon, as discussed herein. Alternatively, the RF altering material could be applied manually, such as by and end user (e.g., a cashier in a retail environment) as discussed herein. The facestock 300 illustrated in FIG. 7 contains a relatively small amount of RF altering material 302. Such an amount of RF altering material 302 could be employed, for example, in an RFID tag where it is desirable to retain a large proportion of the maximum read range (e.g., about 90% or more).

The facestock 300 illustrated in FIG. 8 includes a relatively large section of RF altering material 304. The section of RF altering material 304 is illustrated to have both a larger width and a larger length than the section of the RF altering material 304 illustrated in FIG. 7, although one skilled in the art will appreciate that other dimensional adjustments could be made (e.g., only adjusting the width of the RF altering material 304) such as through applying different sized patterns of RF altering material 304 (e.g. geometric shapes, alpha or numeric characters, etc.). Such a relatively large amount of RF altering material 304 could be employed, for example, in an RFID tag with a substantially reduced read range, for example where the wanted read range is less than 50% of the maximum. Since the size and/or position of the RF altering material section 302 and 304 can be changed with a relatively high precision, the read range of the RFID tag can be fine tuned for specific application environments.

Figure 9:
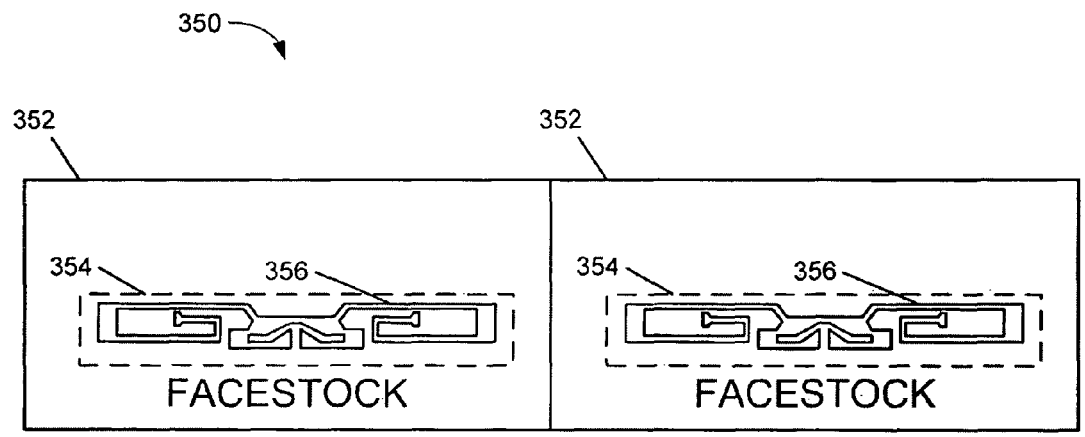
FIG. 9 illustrates an example of a strip of RFID tags in accordance with an aspect of the invention.
Figure 10:
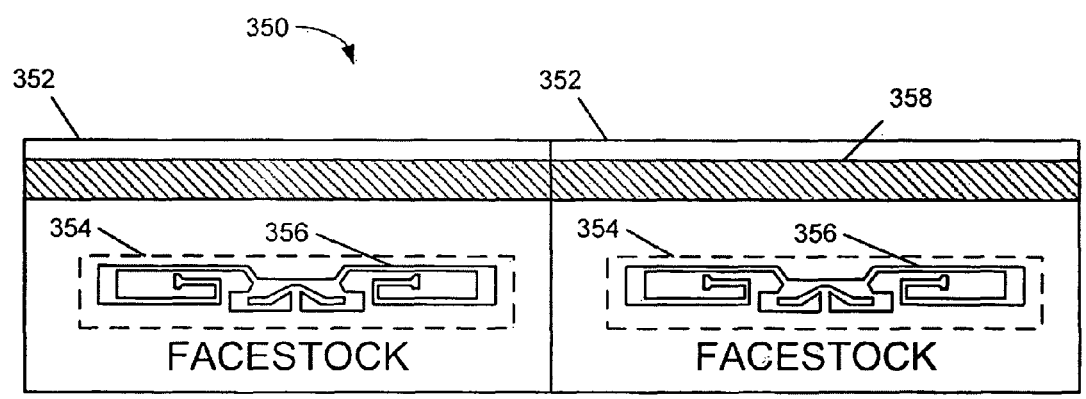
FIG. 10 illustrates another example of a strip of RFID tags in accordance with an aspect of the invention.

FIGS. 9 and 10 illustrate a top view of a portion of an RFID tag strip 350 in accordance with an aspect of the invention. For purposes of simplification of explanation, the same reference numbers will be used in FIGS. 9 and 10 to indicate the same structure. The RFID tag strip 350 could include, for example, a continuous roll of material 352, wherein each facestock section or tag 352 includes an RFID inlay 354. For purposes of simplification of explanation, only an antenna 356 for each RFID inlay 354 is illustrated, but it is to be understood that each RFID inlay 354 also includes an associated integrated circuit chip. The facestock section 352 could be formed, for example with paper or plastic. In FIG. 9, no RF altering material is included. The facestock section 352 illustrated in FIG. 9 can have, for example, a maximum read range (e.g., about 8 meters).

In FIG. 10, each facestock section 352 includes RF altering material 358. The RF altering material 358 could be applied, for example, by a thermal printer or a printer with a ribbon containing the RF altering material 358. The RF altering material 358 could be formed, for example, with a conductive material, a dielectric material a material with a high magnetic permeability, or a combination thereof. Moreover, the proximity of the RF altering material 358 to each RFID inlay 354 could be chosen to achieve a specific read range. The RF altering material 358 could be employed, for example, to alter the read range for an RFID tag. For instance, the RF altering material 358 could alter the sensitivity of an associated RFID tag. Altering the sensitivity could, for example, alter the radiation pattern of the associated RFID tag, thereby altering a direction in which the inlay 354 antenna 356 radiates or detects RF signals.

Since the size and/or the position of the RF altering material section 358 can be changed with a relatively high precision, the read range of the RFID tag can be fine tuned for specific application environments. Moreover, since the RFID tag strip 350 is formed with a continuous roll, a printer that prints the RF altering material section 358 could be configured to print the RF altering material section 358 continuously for the entire web, or some portion thereof, thereby providing an efficient process of making a large quantity of RFID tags with a specific read range.

Figure 11:
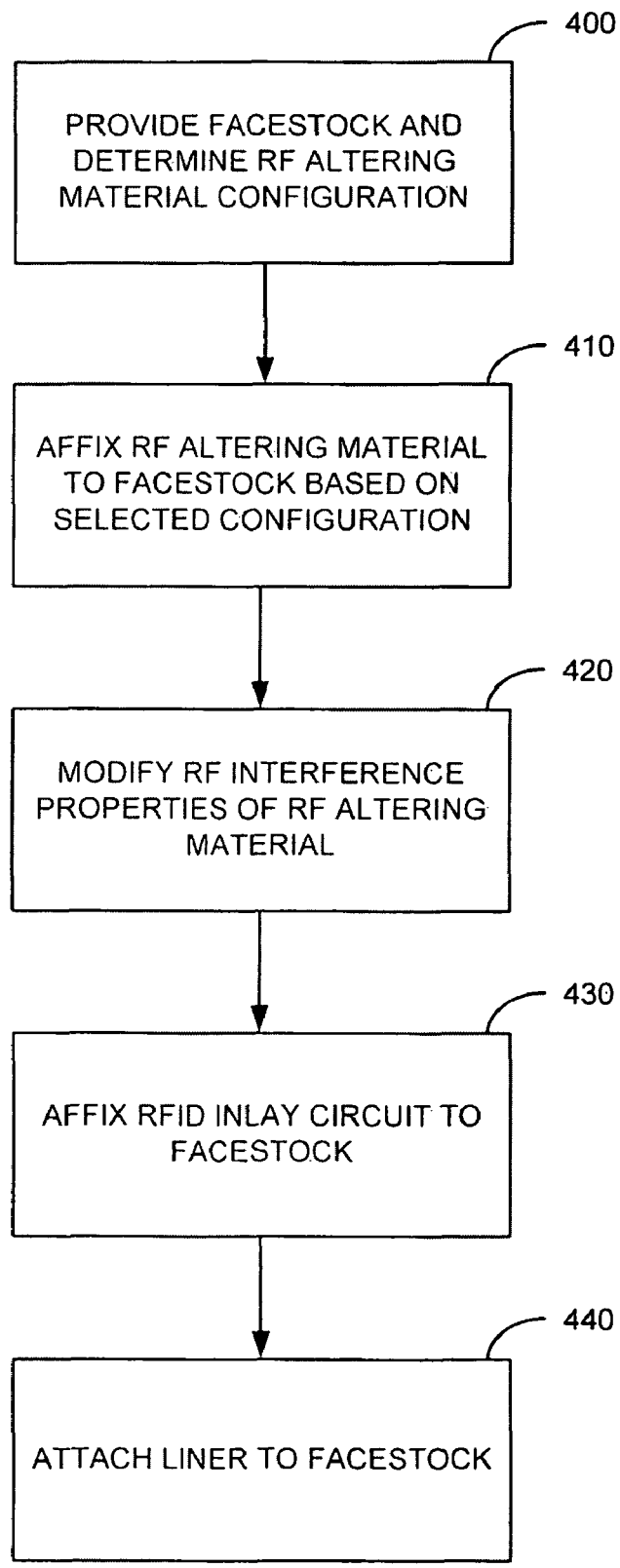
FIG. 11 illustrates an example of a flow chart of a methodology for forming an RFID tag in accordance with an aspect of the invention.

In view of the foregoing structural and functional features described above, methodologies will be better appreciated with reference to FIG. 11. It is to be understood and appreciated that the illustrated actions, in other embodiments, may occur in different orders and/or concurrently with other actions. Moreover, not all illustrated features may be required to implement a method.

FIG. 11 illustrates a flow chart of a methodology for forming an RFID tag in accordance with an aspect of the invention. At 400, a web of facestock is provided and an RF altering material configuration is selected to affix to the facestock. The configurations can be chosen, for example, based on the environment of application for the RFID tag. For example, particular types of an RF altering material, particular amounts of the RF altering material and/or the physical structure of the RF altering material can be chosen to limit an RFID tag's read range to a specific range. The RF altering material could include, for example, a conductive material, a highly magnetically permeable material, a dielectric material or a combination thereof. At 410, the RF material is affixed to the web of facestock or individual sections based on the selected configuration. The methodology then proceeds to 420.

At 420, RF interference (e.g., RF altering) properties of the RF altering material can be modified to fine tune the RF interfering properties provided on or in the facestock or substrate. As an example, the RF altering material can be exposed to environmental conditions (e.g., heat, UV light, etc.) to modify the RF interfering properties provided on the facestock. Adjusting the intensity (e.g., the temperature) and/or the duration of the exposure to the environmental conditions can alter the RF interfering properties in a desired manner. For instance, if the RF interfering material is implemented as a conductive organic compound, the conductivity (and therefore the interfering properties) of the conductive organic compound could be modified by exposing the conductive organic compound to UV light.

At 430, an RFID inlay can be affixed to the facestock. The RFID inlay can be affixed to the facestock, for example, by an adhesive material, such as a pressure sensitive adhesive. At 440, a liner can also be attached to the RFID inlay. The liner can be removeably or permanently attached to the RFID inlay. The process 400 could be performed, for example, by a thermal printer, rolling press, an injection molder, or a combination thereof depending on the materials chosen for the facestock and/or the liner.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

What is claimed is:

1. A radio-frequency identification (RFID) tag comprising:
an RFID inlay having a read range;
a facestock affixed to the RFID inlay by adhesive; and
a radio frequency (RF) altering material affixed to the facestock that is configured to reduce the read range of the RFID inlay wherein the RF altering material is configured to change states upon exposure to an environmental change to the RF altering material, such that the RF altering material changes from a first state that does not alter the read range of the RFID inlay to a second state that does alter the read range of the RFID inlay.

2. The RFID tag of claim 1, wherein the RF altering material comprises an adhesive layer that binds the facestock to the RFID inlay.

3. The RFID tag of claim 2, wherein the adhesive layer includes a plurality of particles with RF signal altering properties.

4. The RFID tag of claim 1, where the RF altering material reduces read range to about zero of the REED inlay.

5. The RFID tag of claim 1, wherein the RF altering material has a relatively high magnetic permeability configured to interact with the magnetic field around the RFID inlay.

6. The RFID tag of claim 1, wherein the RF altering material is a dielectric material configured to interact with an electric field around the RFID inlay.

7. The RFID tag of claim 1, wherein the RF altering material is a layer of material disposed on a back of the facestock.

8. The RFID tag of claim 1, wherein the RF altering material is a thin layer of vapor deposited metal.

9. The RFID tag of claim 1, wherein the RF altering material is conductive ink printed on the facestock.

10. The RFID tag of claim 1, wherein the environmental change is at least one of temperature, pressure and ultra violet radiation.

11. The RFID tag of claim 1, wherein the RF altering material is an organic organometallic material.

12. The RFID tag of claim 1, wherein the amount of altering of the read range is based on at least one of the amount of environmental change and exposure time of environmental change.

13. The RFID tag of claim 1, wherein the read range of the RFID inlay is tunable based on the amount and/or location of the RF altering material.

14. A radio-frequency identification (RFID) tag comprising:
an RFID inlay having a read range;
a facestock adhesively affixed to the RFID inlay, wherein the facestock includes a radio frequency (RF) altering material that is configured to reduce the predetermined read range of the RFID inlay;
a liner removeably attached to the RFID inlay; and
wherein the RF altering material is configured to change states upon exposure to an environmental change to the RF altering material, such that the RF altering material changes from a first state that does not alter the read range of the RFID inlay to a second state that does alter the read range of the RFID inlay.

15. The RFID tag of claim 14, wherein the RF altering material comprises at least one of a conductive material, an organic material, a highly magnetically permeable material and a dielectric material.

16. The RFID tag of claim 15, wherein the RF altering material is an adhesive material that affixes the facestock to the RFID inlay.

17. The RFID tag of claim 14, wherein the amount of altering of the read range is based on at least one of the amount of environmental change and an exposure time to the environmental change.

18. The RFID tag of claim 14, wherein the read range of the RFID inlay is tunable based on the amount and/or location of the RF altering material.

19. A method for forming an radio frequency identification (RFID) tag comprising:
providing a facestock;
affixing a radio frequency (RF) altering material to the facestock, the RF altering material being configured to alter a read range of an RFID inlay; and
affixing adhesively the RFID inlay with the read range onto the facestock; and
wherein the RF altering material is configured to change states upon exposure to an environmental change to the RF altering material such that the RF altering material changes from a first state that does not alter the read range of the RFID inlay to a second state that does alter the read range of the RFID inlay.

20. The method of claim 19, further comprising removeably attaching a liner to the RFID inlay.

21. The method of claim 19, wherein the RF altering material is configured to reduce the read range of the RFID inlay.

22. The method of claim 19, wherein the RF altering material comprises at least one of a conductive material, an organic material, a highly magnetically permeable material and a dielectric material.

23. The method of claim 19, wherein the RF altering material is an adhesive material wherein the affixing the RFID inlay to the facestock comprises applying the adhesive material to one of the RFID inlay and the facestock and attaching to an other of the RFID inlay and the facestock.

24. The method of claim 19, further comprising exposing the RF altering material to an environmental change, such that the amount of altering of the read range is based on at least one of the amount of environmental change and an exposure time to the environmental change.

25. The method of claim 19, further comprising determining an amount and location of the RF altering material relative to the facestock and providing the determined amount to the determined location.

* * * * *